William Baxter.

Steam Generator.

No. 3,384. Reissued April 20, 1869.

Witnesses:

E. F. Kastenhuber

Chas. Wahlers

Inventor:

Wm. Baxter

By Van Santvoord & Hauff his atty

United States Patent Office.

WILLIAM BAXTER, OF NEWARK, NEW JERSEY.

*Letters Patent No.* 83,445, *dated October* 27, 1868; *reissue No.* 3,384, *dated April* 20, 1869.

IMPROVEMENT IN STEAM-GENERATOR.

The Schedule referred to in these Letters Patent and making part of the same

*To all whom it may concern:*

Be it known that I, WILLIAM BAXTER, of Newark, in the county of Essex, and State of New Jersey, have invented a new and useful Improvement in Steam-Boilers; and I do hereby declare the following to be a full, clear, and exact description thereof, which will enable those skilled in the art to make and use the same, reference being had to the accompanying drawings, forming part of this specification.

My invention consists—

First, of a steam-boiler, the fire-box of which is provided with descending flues or fire-tubes, passing from the upper combustion-chamber, through the water-space, and communicating with a jacket surrounding said water-space, and extending up to the water-line of the boiler, or thereabouts, for the purposes hereinafter specified.

Second, in forming the cover or top of the boiler or steam-space, or chamber connected therewith, of the upper flange of the steam-cylinder, which is arranged within said boiler or steam-space, as above specified.

To enable those skilled in the art to understand and use my invention, I will proceed to describe the manner in which the same is or may be carried into effect, by reference to the accompanying drawing, in which—

Similar letters indicate corresponding parts.

A represents the fire-box of the boiler, which is provided with a grate, B, in its bottom, and with a combustion-chamber, C, in its top.

Said fire-box and its combustion-chamber are surrounded and covered by the water-space E; and from the combustion-chamber C extend the tubes D, through the water-space, in a downward direction, into the gas-chamber H, which surrounds the ash-box I, and forms the bottom of the main part, J, of the boiler.

This part is surrounded by a jacket, F, forming a smoke-chamber, G′, through which the heated gases rise, and which connects, by a flue, K, with the smoke-stack.

Figure 1:
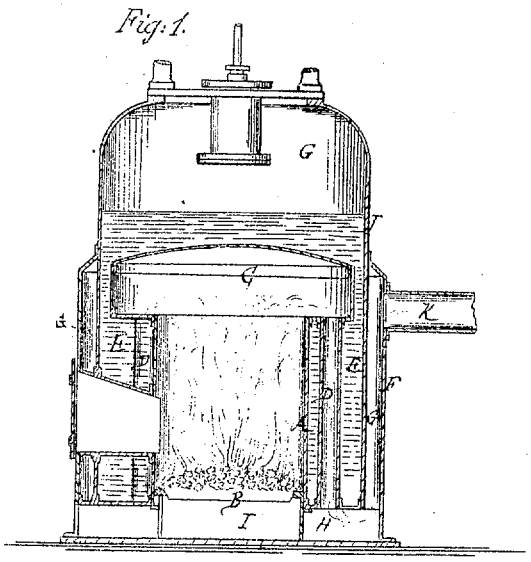
Figure 1 is a vertical central section of a boiler made in accordance with my invention.
Figure 2:
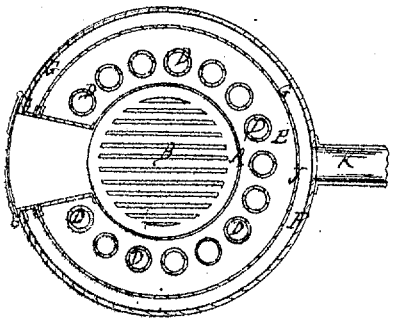
Figure 2 is a horizontal section thereof.

This smoke-chamber terminates below the water-line of the boiler, the jacket F being so formed that it closes up against the main part of the boiler, about at a level with the top of the fire-box, as shown in fig. 1 of the drawing.

The upper portion of the main part J forms the steam-dome G, which is clear above the fire, as shown.

The fire, or the heated products of combustion, on rising from the grate, spread in the combustion-chamber C. Then they descend through the tubes D, and rise again through the smoke-chamber G′, as indicated in fig. 1 of the drawing; and, by these means, a very large heating-surface is obtained; and, furthermore, a complete combustion is effected, the heating-surface being composed of the entire area of the fire-box, the combined area of the tubes D, and the area of the main part J, as far as the same is enclosed by the jacket F, and the complete combustion of the gases being effected in the successive passage of said gases through the chambers C, H, and G′.

As above stated, the jacket F closes up against the main body of the boiler, at or about the level of the water-line, thus leaving the steam-dome removed from the immediate vicinity of the fire, or the heated products of combustion arising therefrom.

This arrangement is, moreover, productive of further advantage, in that it admits of the ready application to the boiler of the steam-cylinder L of the engine, in connection with which the boiler may be used.

The cylinder is let down into the steam-space of the boiler, or into a steam-space or chamber connected therewith, so as to be surrounded by steam at or near the temperature which exists in the boiler, and the steam thus can enter it directly, without any diminution of heat, and without having to pass through the steam-pipes usually employed for this purpose.

The cylinder is held, and, as it were, suspended, in the boiler, or steam-chamber connected therewith, by its upper enlarged flange, M, which, at the same time, forms the cover of the boiler or steam-chamber, being bolted, or otherwise suitably secured in its place, as shown in fig. 1.

I am thus enabled to produce a compact boiler, which, while carrying within it the steam-cylinder, occupies but little space, comparatively.

The cylinder is surrounded by steam at about the same temperature as that which directly enters it from the steam-space, and the full power of the steam is utilized, with a less expenditure of fuel than is usual, and, at the same time, the cylinder, by reason of the manner in which it is held and supported in place, as above described, can be readily removed from or adjusted to the boiler, whenever it is desired.

Having now described my invention, and the manner in which the same is or may be carried into effect,

What I claim, and desire to secure by Letters Patent, is—

1. A steam-generator, the fire-box of which is provided with descending flues or fire-tubes, passing from the upper combustion-chamber, through the water-space, and communicating with a jacket surrounding said water-space, and extending up to the water-line of the boiler, or thereabouts, so as to leave uncovered the dome, in which the steam-cylinder is contained and held, substantially as herein shown and specified.

2. The construction and arrangement, in connection with the boiler or steam-space, or chamber connected therewith, of the upper flange of the steam-cylinder, so that it shall form the top or cover of said boiler or chamber, in which the cylinder is suspended and held, as herein described.

In testimony whereof, I have signed my name to this specification, before two subscribing witnesses.

WM. BAXTER.

Witnesses:

SAM'L PITTS RUSSELL,
WM. D. RUSSELL.